United States Patent
Chae et al.

(10) Patent No.: US 9,196,420 B2
(45) Date of Patent: Nov. 24, 2015

(54) MULTILAYER CERAMIC ELECTRONIC COMPONENT TO BE EMBEDDED IN BOARD AND PRINTED CIRCUIT BOARD HAVING MULTILAYER CERAMIC ELECTRONIC COMPONENT EMBEDDED THEREIN

(71) Applicant: SAMSUNG ELECTRO-MECHANICS CO., LTD., Suwon, Gyunggi-do (KR)

(72) Inventors: Eun Hyuk Chae, Gyunggi-do (KR); Doo Young Kim, Gyunggi-do (KR); Byoung Hwa Lee, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 157 days.

(21) Appl. No.: 14/083,065

(22) Filed: Nov. 18, 2013

(65) Prior Publication Data

US 2015/0021078 A1 Jan. 22, 2015

(30) Foreign Application Priority Data

Jul. 22, 2013 (KR) .................. 10-2013-0086323

(51) Int. Cl.
| | |
|---|---|
| H01G 4/232 | (2006.01) |
| H01G 2/06 | (2006.01) |
| H01G 4/01 | (2006.01) |
| H01G 4/005 | (2006.01) |
| H01G 4/012 | (2006.01) |
| H01G 4/30 | (2006.01) |

(52) U.S. Cl.
CPC ............. *H01G 2/06* (2013.01); *H01G 4/005* (2013.01); *H01G 4/01* (2013.01); *H01G 4/012* (2013.01); *H01G 4/232* (2013.01); *H01G 4/30* (2013.01)

(58) Field of Classification Search
None
See application file for complete search history.

(56) References Cited

U.S. PATENT DOCUMENTS

| 5,883,780 | A | * | 3/1999 | Noji et al. ................ 361/303 |
| 6,577,486 | B1 | * | 6/2003 | Nishimiya et al. ........ 361/104 |

(Continued)

FOREIGN PATENT DOCUMENTS

| JP | 2011-171651 A | 9/2011 |
| JP | 2011-238724 A | 11/2011 |

(Continued)

OTHER PUBLICATIONS

Notice of Office Action Korean Patent Application No. 10-2013-0086323 dated Jul. 24, 2014 with English trnaslation.

*Primary Examiner* — Dion R Ferguson
(74) *Attorney, Agent, or Firm* — McDermott Will & Emery LLP

(57) ABSTRACT

There is provided a multilayer ceramic electronic component, including a ceramic body having first and second side surfaces facing each other, and first and second end surfaces facing each other; first and second internal electrodes having first and second lead portions; and first and second external electrodes extended from the first and second end surfaces of the ceramic body to the first and second side surfaces, respectively, wherein when a distance from an end portion of the first or second external electrode formed on the first or second side surface of the ceramic body to a point of the first or second external electrode connected to the first or second lead portion is defined as G, and a width of the first or second external electrode on the first or second side surface of the ceramic body is defined as BW, 30 μm≤G<BW is satisfied.

14 Claims, 3 Drawing Sheets

(56) References Cited

U.S. PATENT DOCUMENTS

2006/0139849 A1* 6/2006 Yoon et al. ............... 361/306.3
2011/0273815 A1 11/2011 Kobayashi

FOREIGN PATENT DOCUMENTS

| KR | 10-2006-0068404 A | 6/2006 |
| KR | 10-2006-0073274 A | 6/2006 |

* cited by examiner

MULTILAYER CERAMIC ELECTRONIC COMPONENT TO BE EMBEDDED IN BOARD AND PRINTED CIRCUIT BOARD HAVING MULTILAYER CERAMIC ELECTRONIC COMPONENT EMBEDDED THEREIN

CROSS-REFERENCE TO RELATED APPLICATIONS

This application claims the priority of Korean Patent Application No. 10-2013-0086323 filed on Jul. 22, 2013, in the Korean Intellectual Property Office, the disclosure of which is incorporated herein by reference.

BACKGROUND OF THE INVENTION

1. Field of the Invention

The present invention relates to a multilayer ceramic electronic component to be embedded in a board and a printed circuit board having a multilayer ceramic electronic component embedded therein.

2. Description of the Related Art

As electronic circuits have become highly densified and highly integrated, a mounting space for passive elements mounted on a printed circuit board (PCB) has become insufficient, and in order to solve this problem, ongoing efforts have been made to implement components able to be installed within a board, i.e., embedded devices. In particular, various methods have been proposed for installing a multilayer ceramic electronic component used as a capacitive component within a board.

In one of a variety of methods of installing a multilayer ceramic electronic component within a board, the same dielectric material used for a multilayer ceramic electronic component is used as a material for a board and a copper wiring, or the like, is used as an electrode. Other methods for implementing a multilayer ceramic electronic component to be embedded in a board include a method of forming the multilayer ceramic electronic component to be embedded in the board by forming a polymer sheet having high-k dielectrics and a dielectric thin film within the board, a method of installing a multilayer ceramic electronic component within a board, and the like.

In general, a multilayer ceramic electronic component includes a plurality of dielectric layers made of a ceramic material, and internal electrodes interposed between the dielectric layers. By disposing such a multilayer ceramic electronic component within a board, an embedded multilayer ceramic electronic component having high capacitance may be implemented.

In order to manufacture a printed circuit board (PCB) including a multilayer ceramic electronic component embedded therein, a multilayer ceramic electronic component may be inserted into a core board, and via holes are required to be formed in an upper laminated plate and a lower laminated plate by using a laser in order to connect board wirings and external electrodes of the multilayer ceramic electronic component. Laser beam machining, however, considerably increases manufacturing costs of a PCB.

Meanwhile, since the multilayer ceramic electronic component needs to be embedded in the core portion of the board, a nickel/tin (Ni/Sn) plating layer does not need to be formed on the external electrode, unlike in the case of a general multilayer ceramic electronic component mounted on a surface of a board.

That is, since the external electrode of the multilayer ceramic electronic component to be the embedded in the board is electrically connected to a circuit in the board through a via formed of copper (Cu), instead of through a nickel/tin (Si/Sn) layer, a copper (Cu) layer needs to be formed on the external electrode.

Generally, since even the external electrode is formed of copper (Cu) as a main component but also includes glass, the glass component absorbs the laser during laser beam machining for forming the via in the board, and thus, it may be difficult to adjust a depth of the via.

For this reason, such a copper (Cu) plating layer has been separately formed on the external electrode of the multilayer ceramic electronic component to be embedded in the board.

However, due to the separate copper (Cu) plating layer, manufacturing costs may be increased, and due to the permeation of a plating solution, reliability may be deteriorated. Therefore, the above defects still need to be solved.

RELATED ART DOCUMENT (Patent Document 1) Korean Patent Laid-Open Publication No. 2006-0073274

SUMMARY OF THE INVENTION

An aspect of the present invention provides a multilayer ceramic electronic component to be embedded in a board and a printed circuit board having a multilayer ceramic electronic component embedded therein.

According to an aspect of the present invention, there is provided a multilayer ceramic electronic component to be embedded in a board, including: a ceramic body including dielectric layers and having first and second main surfaces facing each other, first and second side surfaces facing each other, and first and second end surfaces facing each other; first and second internal electrodes stacked with the dielectric layers interposed therebetween while being spaced apart from the end surfaces of the ceramic body by predetermined distances, and having first and second lead portions exposed through the first and second side surfaces of the ceramic body; and first and second external electrodes extended from the first and second end surfaces of the ceramic body to the first and second main surfaces and the first and second side surfaces, respectively, wherein when a distance from an end portion of the first or second external electrode formed on the first or second side surface of the ceramic body to a point of the first or second external electrode connected to the first or second lead portion and adjacent to the end portion of the first or second external electrode formed on the first or second side surface is defined as G, and a width of the first or second external electrode on the first or second side surface of the ceramic body is defined as BW, 30 $\mu m \leq G < BW$ may be satisfied.

When a distance from each end surface of the ceramic body to a point of the first or second external electrode connected to the first or second lead portion and adjacent to the end surface of the ceramic body is defined as M, 50 $\mu m \leq M < BW-G$ may be satisfied.

An average thickness of the first and second external electrodes formed on the first and second side surfaces of the ceramic body may be equal to or greater than 5 $\mu m$.

The multilayer ceramic electronic component to be embedded in a board may further include a metal layer formed on the first and second external electrodes, the metal layer being formed of copper (Cu).

According to another aspect of the present invention, there is provided a multilayer ceramic electronic component to be embedded in a board, including: a ceramic body including dielectric layers and having first and second main surfaces facing each other, first and second side surfaces facing each other, and first and second end surfaces facing each other; first and second internal electrodes stacked with the dielectric layers interposed therebetween while being spaced apart from the end surfaces of the ceramic body by predetermined distances, and having first and second lead portions exposed through at least one of the first and second side surfaces of the ceramic body; and first and second external electrodes extended from the first and second end surfaces of the ceramic body to the first and second main surfaces and the first and second side surfaces, respectively, wherein when a distance from an end portion of the first or second external electrode formed on the first or second side surface of the ceramic body to a point of the first or second external electrode connected to the first or second lead portion and adjacent to the end portion of the first or second external electrode formed on the first or second side surface is defined as G, a width of the first or second external electrode on the first or second side surface of the ceramic body is defined as BW, and a distance from each end surface of the ceramic body to a point of the first or second external electrode connected to the first or second lead portion and adjacent to the end surface of the ceramic body is defined as M, 50 µm≤M<BW-G may be satisfied.

An average thickness of the first and second external electrodes formed on the first and second side surfaces of the ceramic body may be equal to or greater than 5 µm.

The first and second external electrodes may be formed of at least one selected from a group consisting of copper (Cu), silver (Ag), nickel (Ni) and an alloy thereof.

The multilayer ceramic electronic component to be embedded in a board may further include a metal layer formed on the first and second external electrodes, the metal layer being formed of copper (Cu).

According to another aspect of the present invention, there is provided a multilayer ceramic electronic component to be embedded in a board, including: a ceramic body including dielectric layers and having first and second main surfaces facing each other, first and second side surfaces facing each other, and first and second end surfaces facing each other; first and second internal electrodes stacked with the dielectric layers interposed therebetween while being spaced apart from the end surfaces of the ceramic body by predetermined distances, and having first and second lead portions exposed through the first and second side surfaces of the ceramic body; and first and second external electrodes extended from the first and second end surfaces of the ceramic body to the first and second main surfaces and the first and second side surfaces, respectively, wherein the first and second external electrodes are electrically connected to the first and second internal electrodes on the side surfaces of the ceramic body, respectively, and an average thickness of the first and second external electrodes formed on the first and second side surfaces of the ceramic body is equal to or greater than 5 µm.

When a distance from an end portion of the first or second external electrode formed on the first or second side surface of the ceramic body to a point of the first or second external electrode connected to the first or second lead portion and adjacent to the end portion of the first or second external electrode formed on the first or second side surface is defined as G, a width of the first or second external electrode on the first or second side surface of the ceramic body is defined as BW, and a distance from each end surface of the ceramic body to a point of the first or second external electrode connected to the first or second lead portion and adjacent to the end surface of the ceramic body is defined as M, 30 µm≤G<BW and 50 µm≤M<BW-G may be satisfied.

The first and second external electrodes may be formed of at least one selected from a group consisting of copper (Cu), silver (Ag), nickel (Ni) and an alloy thereof.

The multilayer ceramic electronic component to be embedded in a board may further include a metal layer formed on the first and second external electrodes, the metal layer being formed of copper (Cu).

According to another aspect of the present invention, there is provided a printed circuit board including: an insulating substrate; and the multilayer ceramic electronic component described above, embedded in the insulating substrate.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
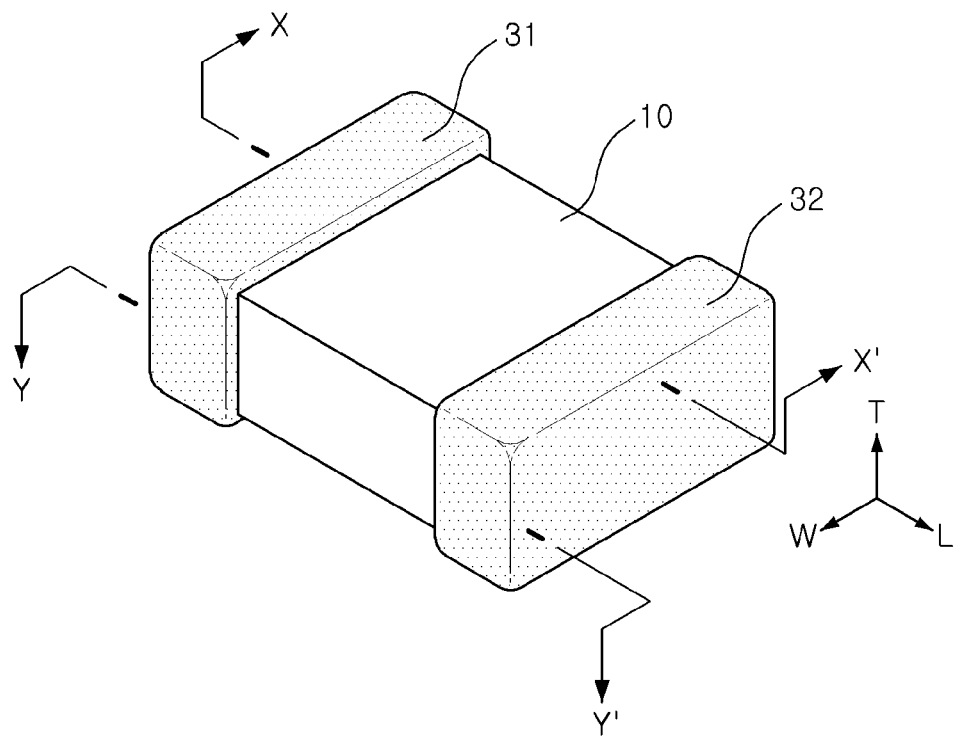
FIG. 1 is a perspective view of a multilayer ceramic electronic component to be embedded in a board according to an embodiment of the present invention.

Hereinafter, embodiments of the present invention will be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a perspective view of a multilayer ceramic electronic component to be embedded in a board according to an embodiment of the present invention.

Figure 2:
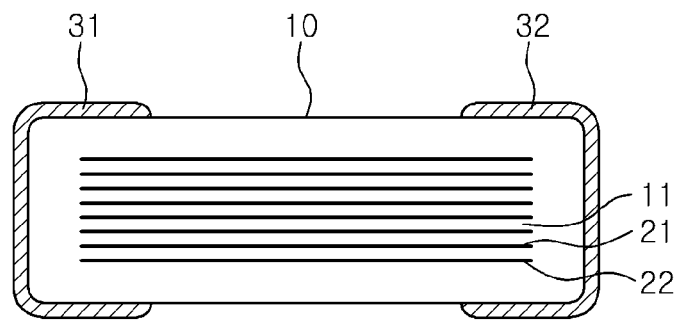
FIG. 2 is a cross-sectional view taken along line X-X' of FIG. 1.

FIG. 2 is a cross-sectional view taken along line X-X' of FIG. 1.

Referring to FIGS. 1 and 2, a multilayer ceramic electronic component to be embedded in a board according to an embodiment of the present invention may include: a ceramic body 10 including dielectric layers 11 and having first and second main surfaces facing each other, first and second side surfaces facing each other, and first and second end surfaces facing each other; first and second internal electrodes 21 and 22 stacked with the dielectric layers 11 interposed therebetween while being spaced apart from the end surfaces of the ceramic body 10 by predetermined distances, and having first and second lead portions 21a, 21b, 22a and 22b exposed through the first and second side surfaces of the ceramic body 10; and first and second external electrodes 31 and 32 extended from the first and second end surfaces of the ceramic body 10 to the first and second main surfaces and the first and second side surfaces, respectively.

Hereinafter, the multilayer ceramic electronic component according to the embodiment of the present invention will be described by taking a multilayer ceramic capacitor by way of example, but the invention is not limited thereto.

In the multilayer ceramic capacitor according to the embodiment of the present invention, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' is the same as a direction in which dielectric layers are laminated, that is, a 'lamination direction'.

According to the embodiment of the invention, a shape of the ceramic body 10 is not particularly limited, but may be hexahedral as illustrated.

According to the embodiment of the present invention, the ceramic body 10 may have the first and second main surfaces facing each other, the first and second side surfaces facing each other, and the first and second end surfaces facing each other. Here, the first and second main surfaces refer to upper and lower surfaces of the ceramic body 10.

According to the embodiment of the invention, a raw material forming the dielectric layers 11 is not particularly limited as long as sufficient capacitance may be obtained thereby, but may be, for example, a barium titanate ($BaTiO_3$) powder.

As a material forming the dielectric layer 11, various ceramic additives, organic solvents, plasticizers, binders, dispersing agents, and the like, may be added to powder such as barium titanate ($BaTiO_3$) powder and the like.

An average particle diameter of the ceramic powder used to form the dielectric layer 11 is not particularly limited, but may be adjusted to satisfy desired dielectric properties. For example, an average particle diameter of the ceramic powder may be adjusted to be equal to or less than 400 nm.

A material for the first and second internal electrodes 21 and 22 is not particularly limited, but may be a conductive paste formed of, for example, precious metals such as palladium (Pd), a palladium-silver (Pd—Ag) alloy, and the like, and at least one of nickel (Ni) and copper (Cu).

The first internal electrodes 21 are stacked with the dielectric layers 11 interposed therebetween while being spaced apart from the end surfaces of the ceramic body 10 by predetermined distances, and having first and second lead portions 21a and 21b exposed through the first and second side surfaces of the ceramic body 10, respectively.

Further, the second internal electrodes 22 are stacked with the dielectric layers 11 interposed therebetween while being spaced apart from the end surfaces of the ceramic body 10 by predetermined distances, and having first and second lead portions 22a and 22b exposed through the first and second side surfaces of the ceramic body 10, respectively.

According to the embodiment of the present invention, the first and second internal electrodes 21 and 22 are stacked while being spaced apart from the end surfaces of the ceramic body 10 by predetermined distances, so that deterioration in reliability due to the permeation of a plating solution can be prevented.

Further, the first and second internal electrodes 21 and 22 may be electrically connected to the first and second external electrodes via the first and second lead portions 21a, 21b, 22a and 22b exposed through the first and second side surfaces of the ceramic body 10.

Unlike a typical structure in which internal electrodes are connected to external electrodes via end surfaces of the ceramic body, the internal electrodes according to the embodiment of the present invention are extended and exposed to only the side surfaces of the ceramic body, so that a current path may be shortened, thereby reducing equivalent series inductance (ESL).

According to the embodiment, the first and second external electrodes 31 and 32 may extend from the first and second end surfaces to first and second main surfaces and to the first and second side surfaces, respectively.

The first and second external electrodes 31 and 32 may be formed to include a conductive metal and glass.

In order to form capacitance, the first and second external electrodes 31 and 32 may extend from the first and second end surfaces of the ceramic body 10 to the first and second main surfaces and to the first and second side surfaces thereof, respectively, and may be electrically connected to the first and second internal electrodes 21 and 22, respectively, via the first and second lead portions 21a, 21b, 22a and 22b exposed through the first and second side surfaces of the ceramic body 10.

The first and second external electrodes 31 and 32 may be formed of the same conductive material as that of the first and second internal electrodes 21 and 22. However, the material of the external electrodes is not limited thereto but may be formed of at least one conductive material selected from a group consisting of copper (Cu), silver (Ag), nickel (Ni) and an alloy thereof.

The first and second external electrodes 31 and 32 may be formed by applying a conductive paste prepared by adding a glass frit to the conductive metal powder to the surfaces of the ceramic body and then performing firing thereon.

According to the embodiment of the present invention, a metal layer formed of copper (Cu) may be further formed on the first and second external electrodes 31 and 32.

However, since a multilayer ceramic capacitor is mounted on a printed circuit board, nickel/tin plating layers are formed on external electrodes.

However, the multilayer ceramic capacitor according to the embodiment of the invention is not mounted on the printed circuit board, but is embedded in the board, and thus, the first and second external electrodes 31 and 32 of the multilayer ceramic capacitor are electrically connected to circuits of the board through vias formed of a copper (Cu) material.

Therefore, according to the embodiment of the present invention, a metal layer formed of copper (Cu) having good electrical connectivity with the vias in the board may be further formed on the first and second external electrodes 31 and 32.

Meanwhile, since the first and second external electrodes 31 and 32 are formed of copper (Cu) as a main component but also include glass, the glass component absorbs laser during laser processing for forming the vias in the board, and thus, it may be difficult to adjust depths of the vias.

Therefore, according to the embodiment of the present invention, a metal layer formed of copper (Cu) is formed on the first and second external electrodes 31 and 32, to thereby overcome the defect.

The metal layer formed of copper (Cu) may be formed by, but is not limited to, a plating process.

Alternatively, a conductive paste including copper (Cu) without a glass frit may be applied onto the first and second external electrodes 31 and 32. However, the present invention is not limited thereto.

The metal layer formed according to the above applying method may be formed of only copper (Cu).

According to the embodiment of the present invention, an average thickness te of the first and second external electrodes 31 and 32 formed on the first and second side surfaces of the ceramic body 10 may be equal to or greater than 5 μm.

By adjusting the average thickness te of the first and second external electrodes 31 and 32 formed on the first and second side surfaces of the ceramic body 10 to be equal to or greater than 5 μm, deterioration in reliability due to the permeation of a plating solution can be prevented.

If the average thickness te of the first and second external electrodes 31 and 32 formed on the first and second side surfaces of the ceramic body 10 is below 5 μm, reliability may be deteriorated due to the permeation of a plating solution.

Figure 3:
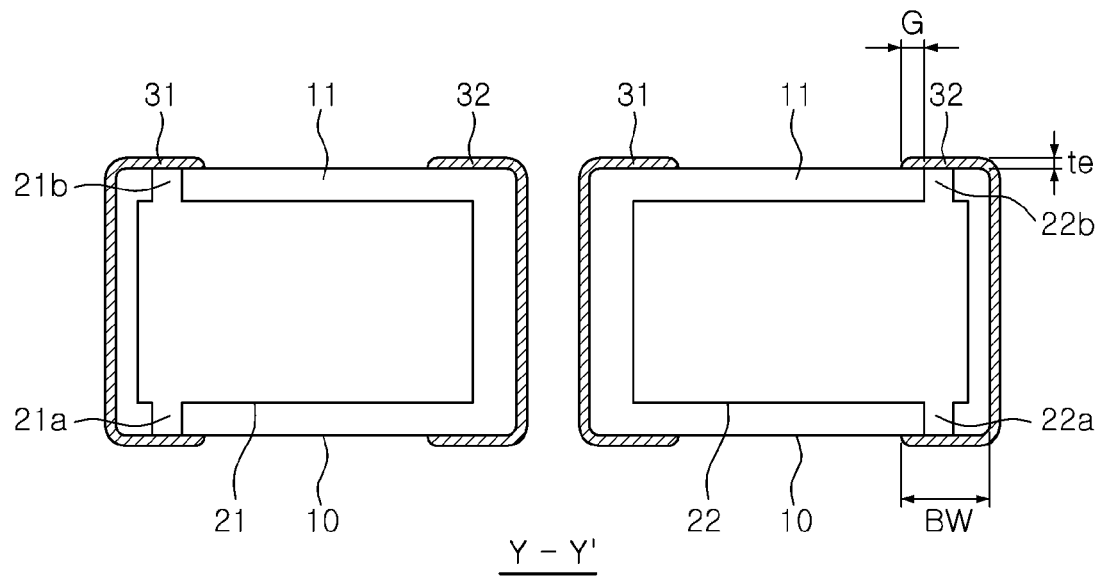
FIG. 3 is a cross-sectional view taken along line Y-Y' of FIG. 1.

FIG. 3 is a cross-sectional view taken along line Y-Y' of FIG. 1.

Referring to FIG. 3, in the multilayer ceramic electronic component according to the embodiment of the present invention, when a distance from an end portion of the first or second external electrode 31 or 32 formed on the first or second side surface of the ceramic body 10 to a point of the first or second external electrode 31 or 32 connected to the first or second lead portion 21a, 21b, 22a or 22b and adjacent to the end portion of the first or second external electrode 31 or 32 formed on the first or second side surface is defined as G, and a width of the first or second external electrode 31 or 32 formed on the first or second side surface of the ceramic body 10 is defined as BW, 30 μm≤G<BW may be satisfied.

The distance G from an end portion of the first or second external electrode 31 or 32 formed on the first or second side surface of the ceramic body 10 to a point of the first or second external electrode 31 or 32 connected to the first or second lead portion 21a, 21b, 22a or 22b and adjacent to the end portion of the first or second external electrode 31 or 32 formed on the first or second side surface may be adjusted to satisfy 30 μm≤G<BW, deterioration in reliability due to the permeation of a plating solution can be prevented.

If distance G from an end portion of the first or second external electrode 31 or 32 formed on the first or second side surface of the ceramic body 10 to a point of the first or second external electrode 31 or 32 connected to the first or second lead portion 21a, 21b, 22a or 22b and adjacent to the end portion of the first or second external electrode 31 or 32 formed on the first or second side surface is below 30 μm, reliability may be deteriorated due to the permeation of a plating solution.

If the distance G from an end portion of the first or second external electrode 31 or 32 formed on the first or second side surface of the ceramic body 10 to a point of the first or second external electrode 31 or 32 connected to the first or second lead portion 21a, 21b, 22a or 22b and adjacent to the end portion of the first or second external electrode 31 or 32 formed on the first or second side surface is equal to the width BW of the first or second external electrode 31 or 32 formed on the first or second side surface of the ceramic body 10, lead portions may not be formed, whereby the internal and external electrodes may not be connected to each other on the side surfaces of the ceramic body 10.

Figure 4:
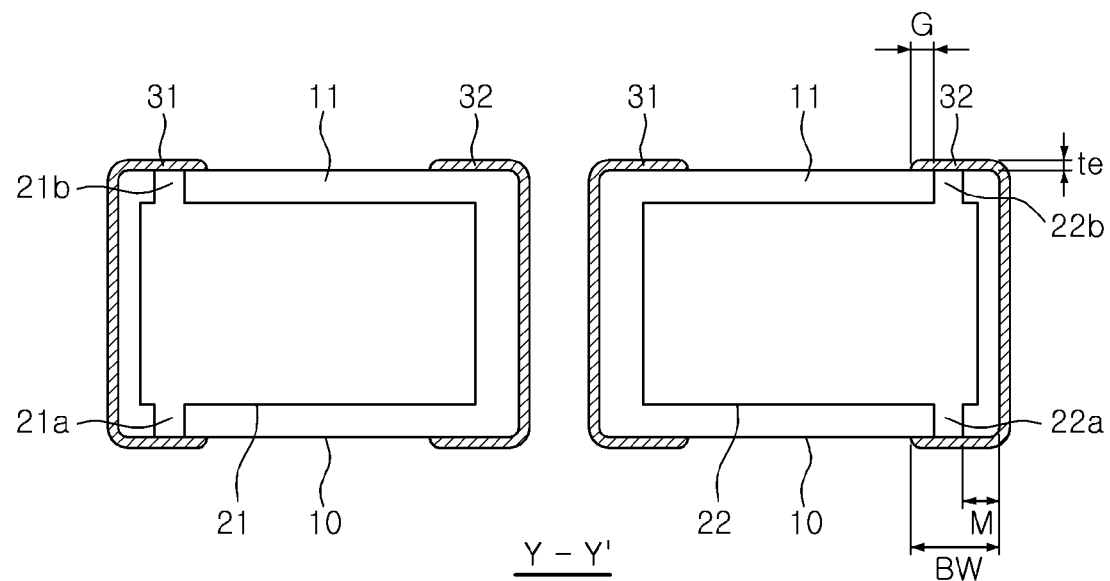
FIG. 4 is a cross-sectional view of a multilayer ceramic electronic component to be embedded in a board according to another embodiment, taken along line Y-Y' of FIG. 1.

FIG. 4 is a cross-sectional view of a multilayer ceramic electronic component to be embedded in a board according to another embodiment, taken along line Y-Y' of FIG. 1.

Referring to FIG. 4, in addition to the features of the above embodiment, in the multilayer ceramic electronic component according to another embodiment of the present invention, when a distance from each end surface of the ceramic body 10 to a point of the first or second external electrode 31 or 32 connected to the first or second lead portion 21a, 21b, 22a or 22b and adjacent to the end surface of the ceramic body 10 is defined as M, 50 μm≤M<BW-G may be satisfied.

The distance M from each end surface of the ceramic body 10 to a point of the first or second external electrode 31 or 32 connected to the first or second lead portion 21a, 21b, 22a or 22b and adjacent to the end surface of the ceramic body 10 may be adjusted to satisfy 50 μm≤M<BW-G, whereby delamination can be prevented, and thus a multilayer ceramic electronic component having good reliability may be implemented.

If the distance M from each end surface of the ceramic body 10 to a point of the first or second external electrode 31 or 32 connected to the first or second lead portion 21a, 21b, 22a or 22b and adjacent to the end surface of the ceramic body 10 is below 50 μm, delamination may occur, and thus reliability may be deteriorated.

If the distance M from each end surface of the ceramic body 10 to a point of the first or second external electrode 31 or 32 connected to the first or second lead portion 21a, 21b, 22a or 22b and adjacent to the end surface of the ceramic body 10 is equal to BW-G, lead portions may not be formed, so that the internal and external electrodes may not be connected to each other on the side surfaces of the ceramic body 10.

The average thickness to of the first and second external electrodes 31 and 32 formed on the first and second side surfaces of the ceramic body 10, the distance G from an end portion of the first or second external electrode 31 or 32 formed on the first or second side surface of the ceramic body 10 to a point of the first or second external electrode 31 or 32 connected to the first or second lead portion 21a, 21b, 22a or 22b and adjacent to the end portion of the first or second external electrode 31 or 32 formed on the first or second side surface, the width BW of the first or second external electrode 31 or 32 formed on the first or second side surface of the ceramic body 10, and the distance M from each end surface of the ceramic body 10 to a point of the first or second external electrode 31 or 32 connected to the first or second lead portion 21a, 21b, 22a or 22b and adjacent to the end surface of the ceramic body 10, may be measured from an image obtained by scanning a cross-section of the ceramic body 10 in a length-width direction using a scanning electron microscope, as shown in FIGS. 3 and 4.

For example, as shown in FIGS. 3 and 4, from an image obtained by scanning a cross-section of the ceramic body 10 in a length-width direction cut in the middle in the thickness (T) direction of the ceramic body 10 using a scanning electron microscope (SEM), widths and thicknesses of respective parts of the first and second external electrodes 31 and 32 may be measured.

According to another embodiment of the present invention, there may be provided a multilayer ceramic electronic component to be embedded in a board, the multilayer ceramic electronic component including: a ceramic body 10 including dielectric layers 11 and having first and second main surfaces facing each other, first and second side surfaces facing each other, and first and second end surfaces facing each other; first and second internal electrodes 21 and 22 stacked with the dielectric layers 11 interposed therebetween while being spaced apart from the end surfaces of the ceramic body 10 by predetermined distances, and having first and second lead portions 21a, 21b, 22a and 22b exposed through at least one of the first and second side surfaces of the ceramic body 10; and first and second external electrodes 31 and 32 extended from the first and second end surfaces of the ceramic body 10 to the first and second main surfaces and the first and second side surfaces, respectively, wherein when a distance from an end portion of the first or second external electrode 31 or 32 formed on the first or second side surface of the ceramic body 10 to a point of the first or second external electrode 31 or 32 connected to the first or second lead portion 21a, 21b, 22a or 22b and adjacent to the end portion of the first or second external electrode 31 or 32 formed on the first or second side surface is defined as G, and a width of the first or second external electrode 31 or 32 formed on the first or second side surface of the ceramic body 10 is defined as BW, and a distance from each end surface of the ceramic body 10 to a point of the first or second external electrode 31 or 32 connected to the first or second lead portion 21a, 21b, 22a or 22b and adjacent to the end surface of the ceramic body 10 is defined as M, 50 µm≤M<BW-G may be satisfied.

The average thickness of the first and second external electrodes formed on the first and second side surfaces of the ceramic body may be equal to or greater than 5 µm.

The first and second external electrodes may be formed of at least one selected from a group consisting of copper (Cu), silver (Ag), nickel (Ni) and an alloy thereof.

A metal layer formed of copper (Cu) may be further formed on the first and second external electrodes.

Other features of the multilayer ceramic capacitor according to another embodiment are the same as those described above with respect to the above embodiment; and, therefore, will not be repeated.

According to another embodiment of the present invention, there may be provided a multilayer ceramic electronic component to be embedded in a board, the multilayer ceramic electronic component including: a ceramic body 10 including dielectric layers 11 and having first and second main surfaces facing each other, first and second side surfaces facing each other, and first and second end surfaces facing each other; first and second internal electrodes 21 and 22 stacked with the dielectric layers 11 interposed therebetween while being spaced apart from the end surfaces of the ceramic body 10 by predetermined distances, and having lead portions 21a, 21b, 22a and 22b exposed through at least one of the first and second side surfaces of the ceramic body 10; and first and second external electrodes 31 and 32 extended from the first and second end surfaces of the ceramic body 10 to the first and second main surfaces and the first and second side surfaces, respectively, wherein the first and second external electrodes 31 and 32 are electrically connected to the first and second internal electrodes 21 and 22 on the side surfaces of the ceramic body 10, and the average thickness of the first and second external electrodes 31 and 32 formed on the first and second side surfaces of the ceramic body 10 is equal to or greater than 5 µm.

When a distance from an end portion of the first or second external electrode 31 or 32 formed on the first or second side surface of the ceramic body 10 to a point of the first or second external electrode 31 or 32 connected to the first or second lead portion 21a, 21b, 22a or 22b and adjacent to the end portion of the first or second external electrode 31 or 32 formed on the first or second side surface is defined as G, and a width of the first or second external electrode 31 or 32 formed on the first or second side surface of the ceramic body 10 is defined as BW, and a distance from each end surface of the ceramic body 10 to a point of the first or second external electrode 31 or 32 connected to the first or second lead portion 21a, 21b, 22a or 22b and adjacent to the end surface of the ceramic body 10 is defined as M, 30 µm≤G<BW and 50 µm≤M<BW-G may be satisfied.

The first and second external electrodes may be formed of at least one selected from a group consisting of copper (Cu), silver (Ag), nickel (Ni) and an alloy thereof.

A metal layer formed of copper (Cu) may be further formed on the first and second external electrodes.

Other features of the multilayer ceramic capacitor according to another embodiment are the same as those described above with respect to the above embodiment and therefore, will not be repeated.

In a method of manufacturing a multilayer ceramic electronic component to be embedded in a board according to an embodiment of the invention, a plurality of ceramic green sheets may first be prepared by applying slurry including a barium titanate (BaTiO$_3$) powder and the like to carrier films and drying the same, thereby forming dielectric layers.

The slurry may be prepared by mixing a ceramic powder, a binder, and a solvent, and the slurry may be used to form the ceramic green sheet having a thickness of several µm by a doctor blade method.

Next, a conductive paste for internal electrodes may be prepared to include 40 to 50 parts by weight of a nickel powder having a nickel particle average size of 0.1 to 0.2 µm.

The conductive paste for internal electrodes may be applied to the green sheets by a screen printing method to thereby form internal electrodes, and then the green sheets having the internal electrodes formed thereon may be stacked in an amount of 400 to 500 layers, whereby the ceramic body 10 may be manufactured.

Then, first and second external electrodes including a conductive metal and glass may be formed on upper and lower surfaces and end surfaces of the ceramic body.

The material of the conductive metal is not particularly limited, but may be, for example, at least one selected from a group consisting of copper (Cu), nickel (Ni), silver (Ag), and an alloy thereof.

The glass is not particularly limited, but a material having the same composition as that of glass used to manufacture external electrodes of a general multilayer ceramic capacitor may be used.

The first and second external electrodes may be formed on the upper and lower surfaces and end surfaces of the ceramic body, such that they may be electrically connected to the first and second internal electrodes, respectively.

Then, a metal layer formed of copper (Cu) may be formed on the first and second external electrodes.

Other features of the method according to the embodiment are the same as those described above with respect to the above embodiments of the multilayer ceramic electronic component embedded in a circuit and therefore, will not be repeated.

Figure 5:
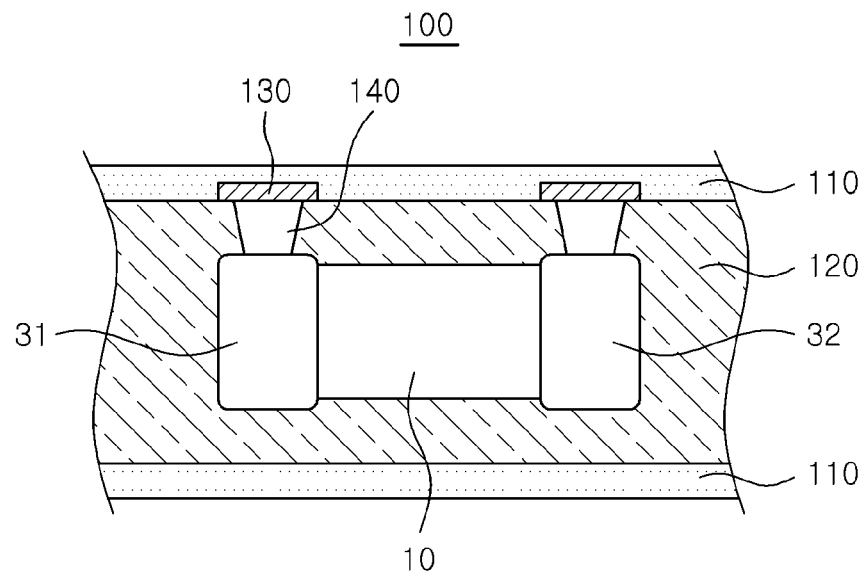
FIG. 5 is a cross-sectional view of a printed circuit board having a multilayer ceramic electronic component embedded therein according to an embodiment of the present invention.

FIG. 5 is a cross-sectional view of a printed circuit board 100 having a multilayer ceramic electronic component embedded therein according to an embodiment of the present invention.

Referring to FIG. 5, the printed circuit board 100 having a multilayer ceramic electronic component embedded therein may include an insulating substrate 110 and the multilayer ceramic electronic component according to the embodiments described above.

The insulating substrate 110 may include an insulating layer 120, and as needed, may include conductive patterns 130 and conductive via holes 140 configuring various types of interlayer circuits as illustrated in FIG. 5. The insulating substrate 110 may be the printed circuit board 100 in which the multilayer ceramic electronic component is provided therein.

The multilayer ceramic electronic component is inserted into the printed circuit board 100, and then may suffer from several harsh conditions during post-processing, such as heat treatment of the printed circuit board 100 and the like.

In particular, the contraction and expansion of the printed circuit board 100 during the heat treatment process directly affect to the multilayer ceramic electronic component inserted into the printed circuit board 100, such that stress may be applied to a bonding surface between the multilayer ceramic electronic component and the printed circuit board 100.

When the stress applied to the bonding surface between the multilayer ceramic electronic component and the printed circuit board 100 is higher than bonding strength, delamination caused by the separation of the bonding surface may occur.

The bonding strength between the multilayer ceramic electronic component and the printed circuit board 100 is in proportion to electrochemical adhesion between the multilayer ceramic electronic component and the printed circuit board 100 and an effective surface area of the bonding surface between the multilayer ceramic electronic component and the printed circuit board 100. In order to improve the effective surface area of the bonding surface, surface roughness of the multilayer ceramic electronic component may be controlled so that the delamination between the multilayer ceramic electronic component and the printed circuit board 100 may be prevented.

In the following, although the present invention will be described in detail with reference to Comparative Examples and Inventive Examples, it is not limited thereto.

Inventive Examples

Inventive Examples were manufactured such that in the multilayer ceramic electronic component to be embedded in the circuit, the average thickness te of the first and second external electrodes formed on the first and second side surfaces of the ceramic body, the distance G from an end portion of the first or second external electrode formed on the first or second side surface of the ceramic body to a point of the first or second external electrode connected to the first or second lead portion and adjacent to the end portion of the first or second external electrode formed on the first or second side surface, and the distance M from each end surface of the ceramic body to a point of the first or second external electrode connected to the first or second lead portion and adjacent to the end surface of the ceramic body satisfied the above numerical ranges.

Comparative Examples

The Comparative Examples were manufactured under the same conditions as those of Inventive Examples, except that the average thickness te of the first and second external electrodes formed on the first and second side surfaces of the ceramic body, the distance G from an end portion of the first or second external electrode formed on the first or second side surface of the ceramic body to a point of the first or second external electrode connected to the first or second lead portion and adjacent to the end portion of the first or second external electrode formed on the first or second side surface, and the distance M from each end surface of the ceramic body to a point of the first or second external electrode connected to the first or second lead portion and adjacent to the end surface of the ceramic body 10 were outside of the above numerical ranges, in the multilayer ceramic electronic component to be embedded in the circuit.

Table 1 below shows compared results of reliability depending on the average thickness to of the first and second external electrodes formed on the first and second side surfaces of the ceramic body and the distance G from an end portion of the first or second external electrode to a point of the first or second external electrode connected to the first or second lead portion and adjacent to the end portion of the first or second external electrode, in the multilayer ceramic electronic component to be embedded in the circuit.

The reliability was evaluated based on whether or not accelerated lifespan was deteriorated due to the permeation of a plating solution. Specifically, the evaluation was conducted at humidity condition 8585 (85° C., 85% humidity) for one hour, with the application of rated voltage. The symbol ⊚ denotes a defect rate below 0.01%, the symbol ○ denotes a defect rate between 0.01% and 1.00%, the symbol Δ denotes a defect rate between 1.00% and 50%, and the symbol X denotes a defect rate above 50%.

TABLE 1

| Samples | Average thickness of external electrodes(te) (μm) | G (μm) | Reliability evaluation |
|---|---|---|---|
| *1 | 1.00 | 10 | X |
| *2 | 1.00 | 20 | X |
| *3 | 1.00 | 30 | X |
| *4 | 1.00 | 40 | X |
| *5 | 1.00 | 50 | X |
| *6 | 3.00 | 10 | Δ |
| *7 | 3.00 | 20 | Δ |
| *8 | 3.00 | 30 | Δ |
| *9 | 3.00 | 40 | Δ |
| *10 | 3.00 | 50 | Δ |
| *11 | 5.00 | 10 | Δ |
| *12 | 5.00 | 20 | Δ |
| 13 | 5.00 | 30 | ○ |
| 14 | 5.00 | 40 | ⊚ |
| 15 | 5.00 | 50 | ⊚ |
| *16 | 7.00 | 10 | Δ |
| *17 | 7.00 | 20 | Δ |
| 18 | 7.00 | 30 | ○ |
| 19 | 7.00 | 40 | ⊚ |
| 20 | 7.00 | 50 | ⊚ |

*Comparative Examples

Referring to Table 1 above, samples 1 to 12, Comparative Examples, in which the average thickness to of the first and second external electrodes formed on the first and second side surfaces of the ceramic body was out of the above numerical range, it can be seen that accelerated lifespan was shortened due to the permeation of a plating solution and thus reliability was deteriorated.

In addition, samples 16 and 17, Comparative Examples, in which the distance G from an end portion of the first or second external electrode to a point of the first or second external electrode connected to the first or second lead portion and adjacent to the end portion of the first or second external electrode was out of the above numerical range, it could be seen that reliability was deteriorated.

On the other hand, samples 13 to 15 and 18 to 20, Inventive Examples, in which the above numerical range was satisfied, it can be seen that they exhibited good reliability.

Table 2 below shows compared results of reliability depending on the distance M from each end surface of the ceramic body to a point of the first or second external electrode connected to the first or second lead portion and adjacent to the end surface of the ceramic body, in the multilayer ceramic electronic component to be embedded in the circuit.

The reliability was evaluated based on whether or not delamination occurred. Specifically, delamination was evaluated using mold checks on the cut cross-surface of the ceramic body. The symbol ⊚ denotes a defect rate below 0.01%, the symbol ○ denotes a defect rate between 0.01% and 1.00%, the symbol Δ denotes a defect rate between 1.00% and 50%, and the symbol X denotes a defect rate above 50%.

TABLE 2

| Samples | M (μm) | Reliability evaluation |
|---------|--------|------------------------|
| *21     | 20     | X                      |
| *22     | 25     | X                      |
| *23     | 30     | X                      |
| *24     | 35     | Δ                      |
| *25     | 40     | Δ                      |
| *26     | 45     | Δ                      |
| 27      | 50     | ○                      |
| 28      | 55     | ○                      |
| 29      | 65     | ○                      |
| 30      | 70     | ⊚                      |
| 31      | 75     | ⊚                      |
| 32      | 80     | ⊚                      |

*Comparative Examples

Referring to Table 2 above, samples 21 to 26, Comparative Examples, in which the distance M from each end surface of the ceramic body to a point of the first or second external electrode connected to the first or second lead portion and adjacent to the end surface of the ceramic body was out of the numerical range, it could be seen that delamination occurred and thus reliability was deteriorated.

On the other hand, samples 27 to 32, Inventive Examples, in which the above range was satisfied, it could be seen that they exhibited good reliability.

Figure 6:
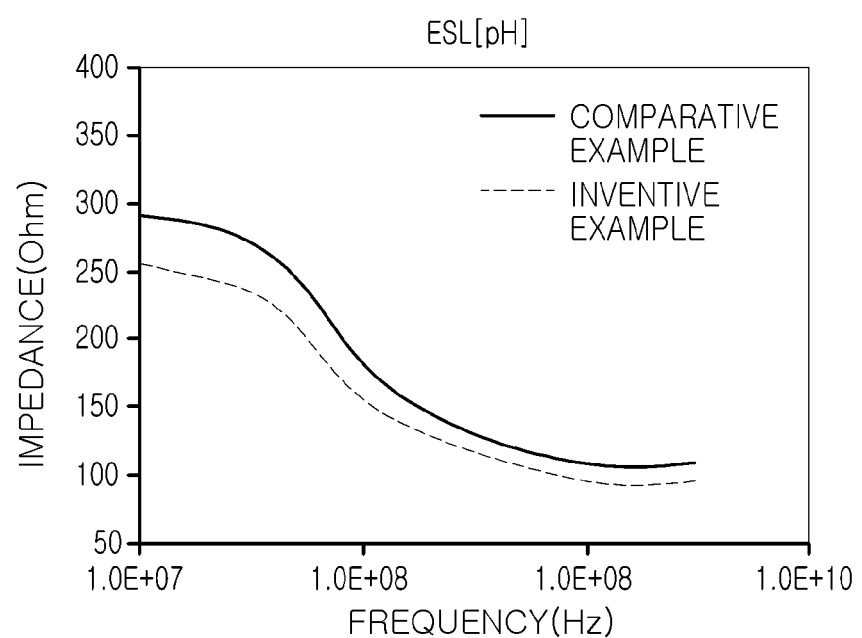
FIG. 6 is a graph showing equivalent series inductance (ESL) according to Inventive Examples and Comparative Examples.

FIG. 6 is a graph showing equivalent series inductance (ESL) according to Inventive Examples and Comparative Examples.

Referring to FIG. 6, it could be seen that the equivalent series inductance (ESL) according to Inventive Examples was lower than the equivalent series inductance (ESL) according to Comparative Examples.

As set for the above, according to the embodiments of the present invention, the internal electrodes of the multilayer ceramic electronic component to be embedded in the board are extended and exposed only through the side surfaces of the ceramic body, the current path may be shortened, thereby reducing equivalent series inductance (ESL).

Further, by extending and exposing the internal electrodes only through the side surfaces of the ceramic body, deterioration in reliability due to the permeation of a plating solution can be prevented.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component to be embedded in a board, comprising:
    a ceramic body including dielectric layers and having first and second main surfaces facing each other, first and second side surfaces facing each other, and first and second end surfaces facing each other;
    first and second internal electrodes stacked with the dielectric layers interposed therebetween while being spaced apart from the end surfaces of the ceramic body by predetermined distances, and having first and second lead portions exposed through the first and second side surfaces of the ceramic body; and
    first and second external electrodes extended from the first and second end surfaces of the ceramic body to the first and second main surfaces and the first and second side surfaces, respectively,
    wherein when a distance from an end portion of the first or second external electrode formed on the first or second side surface of the ceramic body to a point of the first or second external electrode connected to the first or second lead portion and adjacent to the end portion of the first or second external electrode formed on the first or second side surface is defined as G, and a width of the first or second external electrode on the first or second side surface of the ceramic body is defined as BW, 30 μm≤G<BW is satisfied.

2. The multilayer ceramic electronic component of claim 1, wherein when a distance from each end surface of the ceramic body to a point of the first or second external electrode connected to the first or second lead portion and adjacent to the end surface of the ceramic body is defined as M, 50 μm≤M<BW-G is satisfied.

3. The multilayer ceramic electronic component of claim 1, wherein an average thickness of the first and second external electrodes formed on the first and second side surfaces of the ceramic body is equal to or greater than 5 μm.

4. The multilayer ceramic electronic component of claim 1, further comprising a metal layer formed on the first and second external electrodes, the metal layer being formed of copper (Cu).

5. A multilayer ceramic electronic component to be embedded in a board, comprising:
    a ceramic body including dielectric layers and having first and second main surfaces facing each other, first and second side surfaces facing each other, and first and second end surfaces facing each other;
    first and second internal electrodes stacked with the dielectric layers interposed therebetween while being spaced apart from the end surfaces of the ceramic body by predetermined distances, and having first and second lead portions exposed through at least one of the first and second side surfaces of the ceramic body; and
    first and second external electrodes extended from the first and second end surfaces of the ceramic body to the first and second main surfaces and the first and second side surfaces, respectively,
    wherein when a distance from an end portion of the first or second external electrode formed on the first or second side surface of the ceramic body to a point of the first or second external electrode connected to the first or second lead portion and adjacent to the end portion of the first or second external electrode formed on the first or second side surface is defined as G, a width of the first or second external electrode on the first or second side surface of the ceramic body is defined as BW, and a distance from each end surface of the ceramic body to a point of the first or second external electrode connected to the first or second lead portion and adjacent to the end surface of the ceramic body is defined as M, 50 μm≤M<BW-G is satisfied.

6. The multilayer ceramic electronic component of claim 5, wherein an average thickness of the first and second external electrodes formed on the first and second side surfaces of the ceramic body is equal to or greater than 5 μm.

7. The multilayer ceramic electronic component of claim 5, wherein the first and second external electrodes are formed of at least one selected from a group consisting of copper (Cu), silver (Ag), nickel (Ni) and an alloy thereof.

8. The multilayer ceramic electronic component of claim 5, further comprising a metal layer formed on the first and second external electrodes, the metal layer being formed of copper (Cu).

9. A multilayer ceramic electronic component to be embedded in a board, comprising:
- a ceramic body including dielectric layers and having first and second main surfaces facing each other, first and second side surfaces facing each other, and first and second end surfaces facing each other;
- first and second internal electrodes stacked with the dielectric layers interposed therebetween while being spaced apart from the end surfaces of the ceramic body by predetermined distances, and having first and second lead portions exposed through the first and second side surfaces of the ceramic body; and
- first and second external electrodes extended from the first and second end surfaces of the ceramic body to the first and second main surfaces and the first and second side surfaces, respectively,
- wherein the first and second external electrodes are electrically connected to the first and second internal electrodes on the side surfaces of the ceramic body, respectively, and an average thickness of the first and second external electrodes formed on the first and second side surfaces of the ceramic body is equal to or greater than 5 μm; and
- when a distance from an end portion of the first or second external electrode formed on the first or second side surface of the ceramic body to a point of the first or second external electrode connected to the first or second lead portion and adjacent to the end portion of the first or second external electrode formed on the first or second side surface is defined as G, a width of the first or second external electrode on the first or second side surface of the ceramic body is defined as BW, and a distance from each end surface of the ceramic body to a point of the first or second external electrode connected to the first or second lead portion and adjacent to the end surface of the ceramic body is defined as M, 30 μm≤G<BW and 50 μm≤M<BW-G are satisfied.

10. The multilayer ceramic electronic component of claim 9, wherein the first and second external electrodes are formed of at least one selected from a group consisting of copper (Cu), silver (Ag), nickel (Ni) and an alloy thereof.

11. The multilayer ceramic electronic component of claim 9, further comprising a metal layer formed on the first and second external electrodes, the metal layer being formed of copper (Cu).

12. A printed circuit board having a multilayer ceramic electronic component embedded therein, the printed circuit board comprising:
- an insulating board; and
- the multilayer ceramic electronic component of claim 1 embedded in the insulating substrate.

13. A printed circuit board having a multilayer ceramic electronic component embedded therein, the printed circuit board comprising:
- an insulating board; and
- the multilayer ceramic electronic component of claim 5 embedded in the insulating substrate.

14. A printed circuit board having a multilayer ceramic electronic component embedded therein, the printed circuit board comprising:
- an insulating board; and
- the multilayer ceramic electronic component of claim 9 embedded in the insulating substrate.

* * * * *